United States Patent
Endou

(10) Patent No.: US 9,439,160 B2
(45) Date of Patent: Sep. 6, 2016

(54) NETWORK MANAGEMENT SYSTEM

(71) Applicant: YOKOGAWA ELECTRIC CORPORATION, Musashino-shi, Tokyo (JP)

(72) Inventor: Masahito Endou, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 46 days.

(21) Appl. No.: 14/343,145

(22) PCT Filed: Jun. 21, 2013

(86) PCT No.: PCT/JP2013/067035
§ 371 (c)(1),
(2) Date: Mar. 6, 2014

(87) PCT Pub. No.: WO2014/002878
PCT Pub. Date: Jan. 3, 2014

(65) Prior Publication Data
US 2014/0233554 A1 Aug. 21, 2014

(30) Foreign Application Priority Data
Jun. 29, 2012 (JP) ................................. 2012-147173

(51) Int. Cl.
*H04L 12/66* (2006.01)
*H04W 56/00* (2009.01)
(Continued)

(52) U.S. Cl.
CPC .......... *H04W 56/001* (2013.01); *H04J 3/0638* (2013.01); *H04L 12/40182* (2013.01); *H04W 24/04* (2013.01); *H04W 84/12* (2013.01); *H04J 3/0652* (2013.01); *H04L 2012/4026* (2013.01)

(58) Field of Classification Search
CPC ............... H04L 12/66; H04L 2012/46; H04L 2012/5618; H04L 12/46
See application file for complete search history.

(56) References Cited

U.S. PATENT DOCUMENTS 4,500,933 A * 2/1985 Chan ..................... G06F 3/0601
360/48
2003/0060243 A1 3/2003 Burrus, IV
(Continued)

FOREIGN PATENT DOCUMENTS

CN 1855900 A 11/2006
EP 2 874 466 A1 5/2015
(Continued)

OTHER PUBLICATIONS

Yamamoto, et al., "Field Wireless Solution Based on ISA100.11a to Innovate Instrumentation", Yokogawa Technical Information (Yokokawa Giho), Yokogawa Electric Corporation, 2010, pp. 7-12, vol. 53 No. 2 (2010).
(Continued)

*Primary Examiner* — Andrew Lee
(74) *Attorney, Agent, or Firm* — Sughrue Mion, PLLC

(57) ABSTRACT

It is to realize a network management system excellent in its reliability which can prevent a wrong connection when a field wireless management station having a redundant structure is installed, and can make a backbone network redundant so as to improve a trouble resistance.
In a network management system in which filed wireless management stations having gateway functions and system management functions incorporated are redundantly connected together, the plurality of field wireless management stations 11, 12 are connected to each other through a synchronizing cable 30 and synchronizing connectors Can, CNb provided in the synchronizing cable 30.

6 Claims, 5 Drawing Sheets

(51) Int. Cl.
*H04L 12/40* (2006.01)
*H04J 3/06* (2006.01)
*H04W 84/12* (2009.01)
*H04W 24/04* (2009.01)

(56) References Cited

U.S. PATENT DOCUMENTS

| | | | |
|---|---|---|---|
| 2003/0146932 A1 | 8/2003 | Weng et al. | |
| 2005/0223178 A1* | 10/2005 | Garcia et al. | 711/150 |
| 2006/0182211 A1* | 8/2006 | Dollo et al. | 375/354 |
| 2006/0256801 A1* | 11/2006 | Endo | 370/401 |
| 2007/0252612 A1* | 11/2007 | Sylvester | 324/765 |
| 2008/0151915 A1* | 6/2008 | Masuya et al. | 370/401 |
| 2009/0036159 A1* | 2/2009 | Chen | 455/556.1 |
| 2009/0316706 A1* | 12/2009 | Hawley et al. | 370/401 |
| 2010/0088535 A1* | 4/2010 | Agata | 713/375 |
| 2010/0103836 A1* | 4/2010 | Nagy et al. | 370/252 |
| 2011/0004679 A1* | 1/2011 | Lo | 709/223 |
| 2011/0258433 A1* | 10/2011 | Pulini et al. | 713/153 |

FOREIGN PATENT DOCUMENTS

| | | |
|---|---|---|
| JP | 10-285202 A | 10/1998 |
| JP | 2001-118639 A | 4/2001 |
| JP | 2008-502216 A | 1/2008 |
| JP | 2010-146044 A | 7/2010 |
| WO | 2005/122533 A1 | 12/2005 |

OTHER PUBLICATIONS

Yamamoto, et al, "World's First Wireless Field Instruments Based on ISA100.11a", Yokogawa Technical Report (Yokokawa Giho), Yokogawa Electric Corporation, Sep. 17, 2010, pp. 13-16, vol. 53 No. 2.

International Search Report for PCT/JP2013/067035 dated Dec. 17, 2013 [PCT/ISA/210].

Written Opinion for PCT/JP2013/067035 dated Dec. 17, 2013 [PCT/ISA/237].

Search Report dated Feb. 1, 2016 issued by the European Patent Office in counterpart European Patent Application No. 13810588.7.

Communication from the State Intellectual Property Office of P.R. China dated Jan. 15, 2016 in a counterpart Chinese application No. 201380002884.8.

* cited by examiner

NETWORK MANAGEMENT SYSTEM

TECHNICAL FIELD

The present invention relates to a network management system, and more particularly to a redundancy of a field wireless management function.

BACKGROUND ART

A communication between a field device and a control system in a process control system progresses to a wireless represented by a wireless communication standard ISA100.11a for an industrial automation which is determined by an ISA100 committee of an international learned society of instrumentation control (ISA: International Society of Automation) and issued in September, 2009 via a hybrid communication such as HART (a registered trademark) that a digital signal is superimposed on an analog communication of 4 to 20 mA and a digital communication such as FOUNDATION Fieldbus (a registered trademark) or PROFIBUS (a registered trademark) from an analog communication of 4 to 20 mA by a two-wire type signal wire.

By the hybrid communication or the digital communication, a quantity of information that can be used by a plant operation is outstandingly actively increased. As a result, versatile information such as a plurality of process quantities or diagnosis results which are transmitted by devices can be sent to a host system such as a DCS (Distributed Control System) or a device management system, so that facilities can be managed, previewed and maintained.

A field wireless technology that makes the communication between the field device and the control system wireless has many merits, in addition to the above-described merits, for instance, a wiring or an engineering cost can be reduced, devices can be installed in places where the wiring is difficult, and the devices are easily added or removed. Thus, when the above-described merits are put to practical use, it is possible to anticipate a realization of an instrumentation which has been impossible so far.

When the process control system based on the ISA100.11a is formed, a field wireless management station in which a gateway function and a system management function are incorporated is made to be redundant.

FIG. 4 is an explanatory view of a structure which shows an example of a conventional redundant connection of the field wireless management station. In FIG. 4, the field wireless management stations 11 and 12 have the gateway functions and the system management functions incorporated. Main modules 11a and 12a and switch modules 11b and 12b are shown which are provided to realize these functions.

The field wireless management stations 11 and 12 are connected to a host network NW1 and connected to a synchronizing network NW2 to take synchronization between the field wireless management stations, and further connected to a backbone network NW3 to connect backbone routers 21 and 22 thereto.

In non-patent literature 1, the concept of a field wireless solution based on the ISA100.11a and the concept of a field wireless system mainly including the DCS are disclosed.

In non-patent literature 2, a technique relating to a wireless field device and a field wireless system based on the ISA100.11a is disclosed.

Patent literature 1 discloses a technique that simplifies an establishment of a connection in a system which accesses to other system through an addressable and redundant gateway.

Patent literature 2 discloses a technique that early detects a failure of a duplex gateway by alternately using the duplex gateway.

PRIOR ART LITERATURE

Non-Patent Literature

Non-Patent Literature 1: Shuji Yamamoto and two other members, "Field Wireless Solution Based On ISA100.11a Which Reforms Instrumentation", Yokogawa Technical Information, Yokogawa Electric Corporation, 2010, Vol. 53 No. 2 (2010) P. 7-p. 12

Non-Patent Literature 2: Shuji Yamamoto and three other members, "World's First Wireless Field Instruments Based on ISA100.11a", Yokogawa Technical Report, Yokogawa Electric Corporation, 2010. Vol. 53 No. 2(2010) p. 13-p.16

Patent Literature

Patent Literature 1: JP-T-2008-502216
Patent Literature 2: JP-A-10-285202

SUMMARY OF THE INVENTION

Problems that the Invention is to Solve

However, in the structure shown in FIG. 4, since a connection to the host network NW1, the synchronizing network NW2 and the backbone network NW3 is made through connectors of the same form, there is a fear that devices may be probably connected to wrong network ports when the devices are installed.

Further, in the connection of the networks, when general-purpose connectors are used, there is a risk that other devices may be probably connected thereto to give an influence to the synchronization of information.

Although a redundant structure is formed by the two field wireless management stations 11 and 12, even when the field wireless management stations 11 and 12 are not connected to the synchronizing network NW2, the field wireless management stations may be possibly activated.

Further, when the two filed wireless management stations 11 and 12 which form the redundant structure are directly connected to each other, a problem arises that it cannot be discriminated whether a device as a mate of connection is not present or is not connected to the network port of the field wireless management station.

Further, for instance, as shown in FIG. 5, when the two backbone routers 21 and 22 are respectively individually connected to the field wireless management stations 11 and 12 without passing through the backbone network NW3, if a trouble occurs in the field wireless management station 11 or 12, an operation of the backbone router 21 or 22 connected thereto is also unstable.

The present invention is devised by paying attention to these problems and it is an object of the present invention to realize a network management system excellent in its reliability which can prevent a wrong connection when a field wireless management station having a redundant structure is installed, and can make a backbone network redundant so as to improve a trouble resistance.

Means for Solving the Problems

The object of the present invention is achieved by below-described structures.

(1) A network management system in which filed wireless management stations having gateway functions and system management functions incorporated are redundantly connected together,
wherein the plurality of field wireless management stations are connected to each other through a synchronizing cable and synchronizing connectors provided in the synchronizing cable.
(2) The network management system according to the above-described (1), wherein that the plurality of redundantly connected field wireless management stations are connected so as to be individually identified by the synchronizing cable and the synchronizing connectors.
(3) The network management system according to the above-described (1) or (2), wherein the synchronizing cable and the synchronizing connectors also include a power wire.
(4) The network management system according to any one of the above-described (1) to (3), wherein it is detected whether the synchronizing cable and the synchronizing connectors are pulled out from or inserted into at least one of the field wireless management stations in accordance with a function which individually identifies the plurality of redundantly connected field wireless management stations by the synchronizing cable and the synchronizing connectors.

ADVANTAGE OF THE INVENTION

In the present invention, with this structure, it is possible to prevent a wrong connection when a field wireless management station having a redundant structure is installed, and make a backbone network redundant so as to improve a trouble resistance.

MODE FOR CARRYING OUT THE INVENTION

Figure 1:
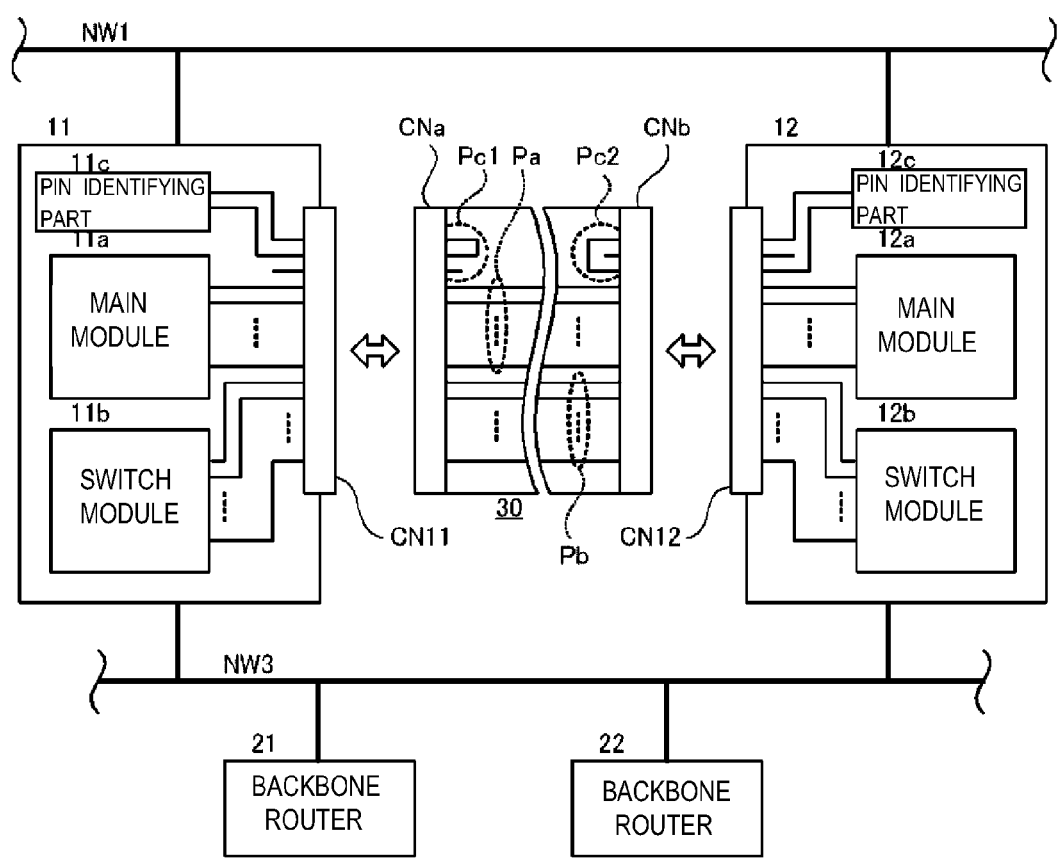
FIG. 1 is an explanatory view of a structure showing one exemplary embodiment of the present invention.
Figure 4:
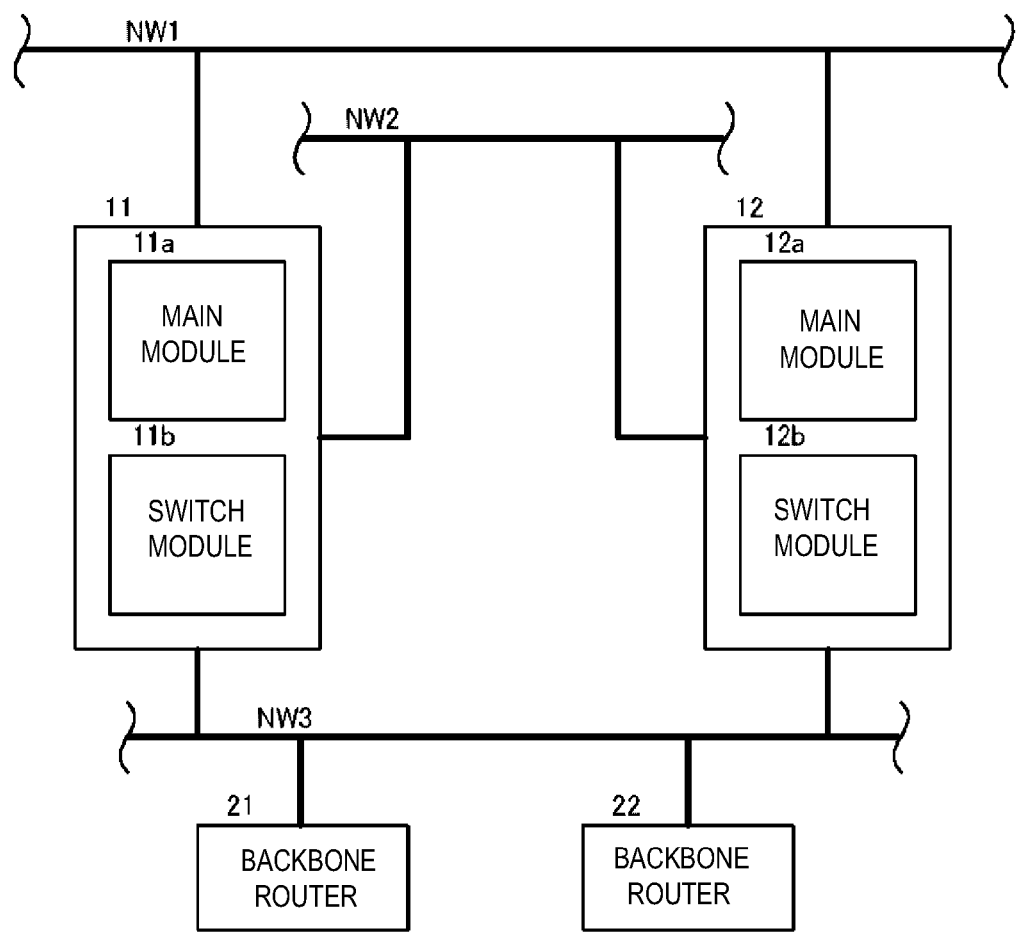
FIG. 4 is an explanatory view of a structure which shows an example of a conventional redundant connection of a field wireless management station.

Now, an exemplary embodiment of a network management system according to the present invention will be described below by using the drawings. FIG. 1 is an explanatory view of a structure showing one exemplary embodiment of the present invention. Parts common to those shown in FIG. 4 are designated by the same reference numerals.
The network management system according to the present exemplary embodiment is a network management system in which field wireless management stations having gateway functions and system management functions incorporated are redundantly connected to each other. As shown in FIG. 1, in the field wireless management stations 11 and 12 of the network management system according to the present exemplary embodiment, pin identifying parts 11c and 12c, main modules 11a and 12a, switch modules 11b and 12b and connectors CN 11 and CN 12 are respectively provided.

Then, a synchronizing cable 30 is connected to the connectors CN 11 and CN 12, so that the main modules 11a and 12a and the switch modules 11b and 12b of the filed wireless management stations 11 and 12 are respectively connected to each other through the synchronizing cable 30.

Further, since the field wireless management stations 11 and 12 are individually identified by the pin identifying parts 11c and 12c, as shown in FIG. 1, pins of the connectors CN 11 and CN 12 that are respectively connected to the pin identifying parts 11c and 12c are different from each other.

The main module 11a, the switch module 11b and the pin identifying part 11c which form the field wireless management station 11 are mutually connected together through an inner bus not shown in the drawing. Further, the main module 12a, the switch module 12b and the pin identifying part 12c which form the field wireless management station 12 are also mutually connected together through an inner bus not shown in the drawing.

In one end of the synchronizing cable 30, a connector CNa is provided which is fitted and connected to the connector CN 11 of the one field wireless management station 11. In the other end, a connector CNb is provided which is fitted and connected to the connector CN 12 of the other field wireless management station 12.

Between the connectors CNa and CNb, are provided a first group of signal wires Pa which connect the main modules 11a and 12a to each other and a second group of signal wires Pb which connect the switch module 11b and 12b to each other.

In the vicinity of the connector CNa, a third group of signal wires Pc1 are provided which identify the one field wireless management station 11. In the vicinity of the connector CNb, a fourth group of signal wires Pc2 are provided which identify the other field wireless management station 12. These connectors CNa and CNb function as synchronizing connectors.

Figure 2:
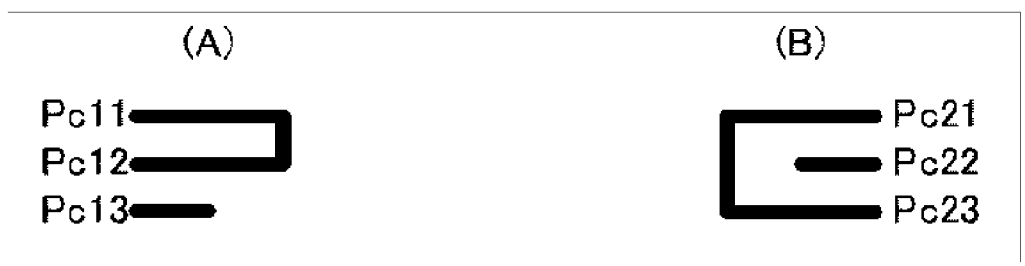
FIGS. 2A and 2B are enlarged views of groups of signal wires in FIG. 1.

FIGS. 2(A) and 2(B) show enlarged views of the groups of signal wires for identifying the field wireless management stations 11 and 12. FIG. 2(A) shows the third group of signal wires Pc1 and FIG. 2(B) shows the fourth group of signal wires Pc2. In the third group of signal wires Pc1 shown in FIG. 2(A), signal wires Pc11 and Pc12 are short-circuit connected to each other. In the fourth group of signal wires Pc2 shown in FIG. 2(B), signal wires Pc21 and Pc23 are connected to each other in a short-circuit state.

Operations of the parts in the structure shown in FIG. 1 will be respectively described.

The main modules 11a and 12a are formed with a CPU or a memory. On the main modules 11a and 12a, an OS operates. The main modules 11a and 12a communicate with each other through the synchronizing cable 30 to make equalization of various kinds of information.

Further, the main modules 11a and 12a periodically monitor the fitted and connected states of the connectors CNa and CNb of the synchronizing cable 30 to the connectors CN 11 and CN 12 respectively through the inner buses not shown in the drawing.

Thus, when a short-circuit state of a prescribed identifying pin cannot be detected, it can be decided that the connectors are not fitted and connected to each other.

The switch modules 11b and 12b are network switches (hubs) and connected to each other through the synchronizing cable 30.

Figure 3:
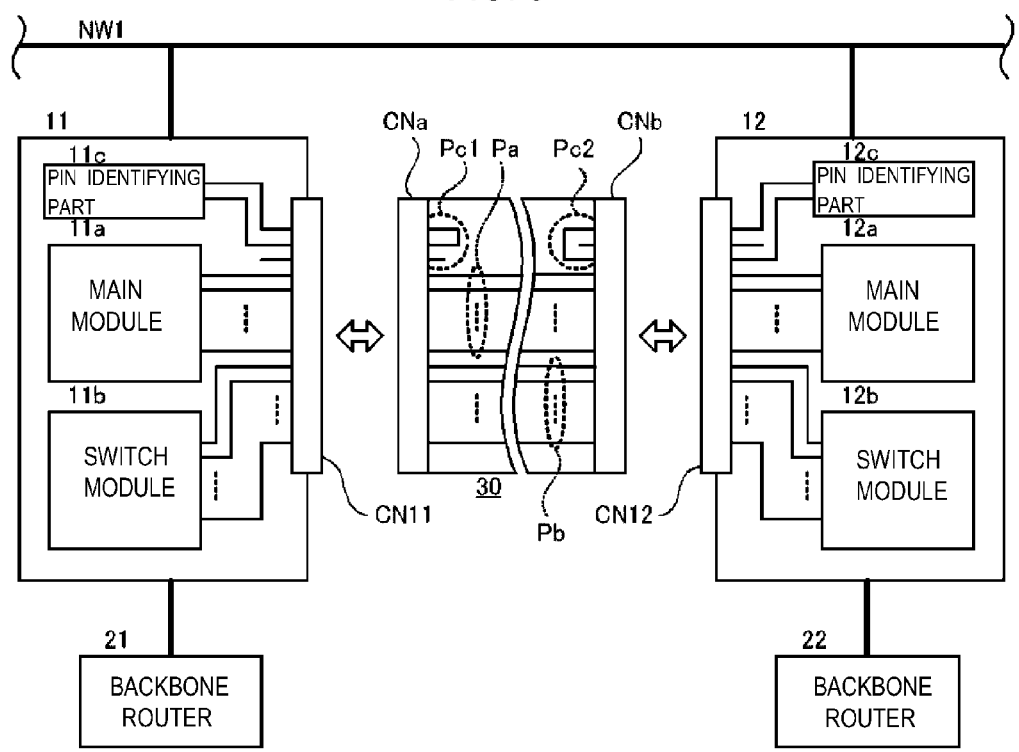
FIG. 3 is an explanatory view of a structure showing another exemplary embodiment of the present invention.
Figure 5:
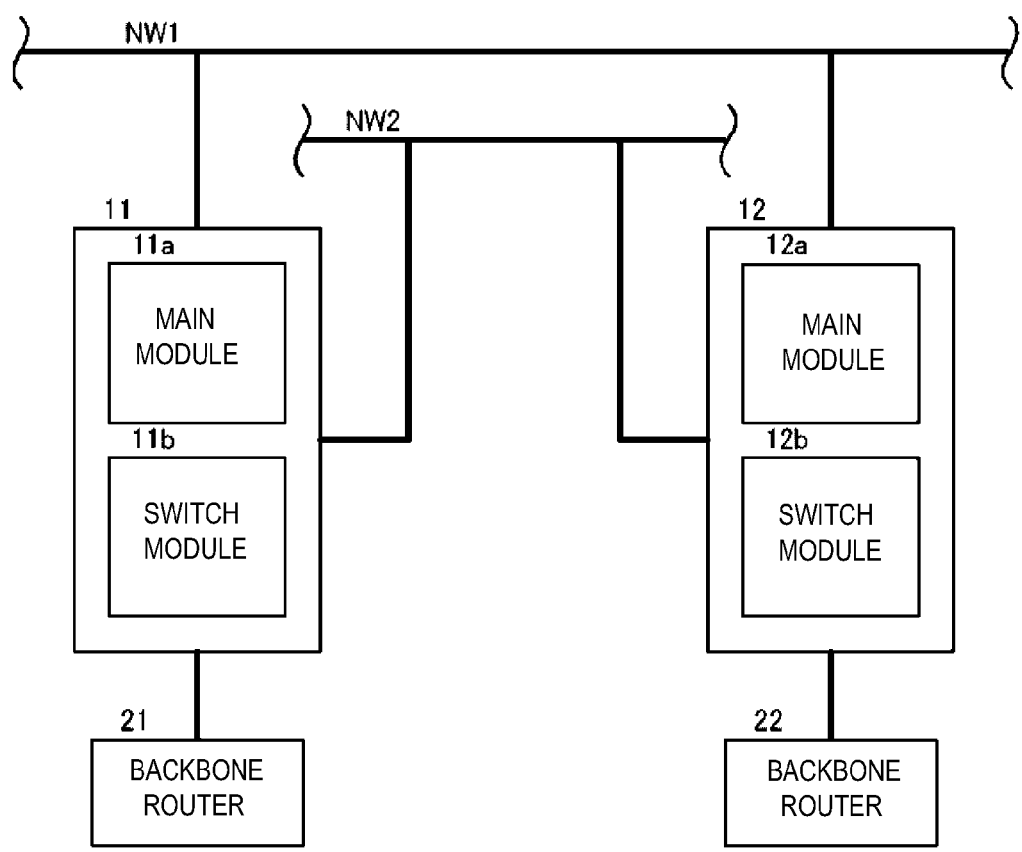
FIG. 5 is an explanatory view of a structure which shows another example of a conventional redundant connection of a field wireless management station.

Thus, for instance, as shown in FIG. 3, even when two backbone routers 21 and 22 are respectively individually connected to the field wireless management stations 11 and 12 without passing through a backbone network NW3, like the conventional structure shown in FIG. 5, the two backbone routers 21 and 22 are substantially connected to the same network.

When the connector CNa of the synchronizing cable 30 is fitted and connected to the connector CN 11, the pin identifying part 11c provided in the field wireless management station 11 detects the short-circuit connection of the signal wires Pc11 and Pc12 in the third group of signal wires Pc1 to identify the field wireless management station 11, and outputs an identified result to the main module 11a.

When the connector CNb of the synchronizing cable 30 is fitted and connected to the connector CN 12, the pin identifying part 12c provided in the field wireless management station 12 detects the short-circuit connection of the signal wires Pc21 and Pc23 in the fourth group of signal wires Pc2 to identify the field wireless management station 12, and outputs an identified result to the main module 12a.

A redundant operation carried out when an abnormality occurs will be described below.

As a precondition, in order to realize the redundant operation, the main modules 11a and 12a are supposed, as describe above, to periodically transmit and receive their information through the synchronizing cable 30 so as to make the equalization of information.

<When Main Module Stops Due to Abnormality>

When the one main module which operates as a master device stops, since the other main module cannot receive the information from the master device for a prescribed time, the other main module decides that an abnormality arises in the master device so that the master device stops and switches an operation mode of the other main module to a master device from a slave device.

When the main module which operates as the slave device stops, the operation mode is not switched.

<When Main Module Detects Internal error>

When the one main module which operates as the master device decides that an internal error arises in the one main module itself, the one main module informs the other main module that the internal error arises, and then, resets the one main module itself.

When the main module which operates as the slave device receives the information of a detection of the internal error from the main module which operates as the master device, the slave device switches its operation mode to the master device from the slave device.

<When Connector is Pulled Out>

When the main module which operates as the master device decides that the connector is pulled out, the main module instantaneously stops an operation of the main module. The other main module which operates as the slave device operates in accordance with the above-described "When Main Module Stops Due to Abnormality".

When a power wire is allowed to pass through the synchronizing cable 30, a power source can be also made to be redundant. When the main module is not allowed to operate as a redundant structure, only the synchronizing connectors are connected thereto. The identifying pins in this case are set to values different from those used at the time of the redundant structure. Thus, it can be discriminated whether the main module operates as a redundant structure or a non-redundant structure depending on the value of the identifying pin.

As described above, according to the present invention, by using the synchronizing cable 30 having the connectors CNa and CNb which function as the synchronizing connectors provided at both ends and the connectors CN 11 and CN 12 used for individually identifying the field wireless management stations 11 and 12 respectively in the pin identifying parts 11c and 12c, a synchronizing network and the backbone network can be made to be redundant.

Further, when the identifying pins are also included in the connectors CNa and CNb which function as the synchronizing connectors, individual identifiers can be respectively added to the two field wireless management stations 11 and 12 to prevent a mistake in setting.

Further, when the synchronizing connectors are not connected, the field wireless management stations are not allowed to be activated. Thus, a wrong operation due to a mistake in connection can be prevented.

Further, signals of the synchronizing network and the backbone network which pass through the synchronizing cable 30 are duplicated, so that reliability can be improved.

Further, the power wire is allowed to pass through the synchronizing cable, so that the power source can be also made to be redundant.

The above-mentioned description merely shows a specifically preferable exemplary embodiment for the purpose of explanation and exemplification of the present invention. Accordingly, the present invention is not limited to the above-described exemplary embodiment and includes more changes and modifications within a range that does not deviate from an essence thereof This application is based on Japanese Patent Application (No. 2012-147173) filed on Jun. 29, 2012, and contents thereof are incorporated herein as a reference.

DESCRIPTION OF REFERENCE NUMERALS AND SIGNS 11, 12 . . . field wireless management station 11a, 12a . . . main module 11b, 12b . . . switch module 11c, 12c . . . pin identifying part CN 11, CN 12 . . . connector NW1 . . . host network 21, 22 . . . backbone router NW3 . . . backbone network 30 . . . synchronizing cable CNa, CNb . . . connector (synchronizing connector) Pa, Pb, Pc1, Pc2 . . . group of signal wires Pc11, Pc12, Pc21, Pc23 . . . signal wire

The invention claimed is:

1. A network management system in which field wireless management stations having gateway functions and system management functions incorporated are redundantly connected together,
   wherein the plurality of field wireless management stations are connected to each other through a synchronizing cable and synchronizing connectors provided in the synchronizing cable, the respective synchronizing connectors for the field wireless management stations being physically configured different from each other,
   wherein the synchronizing connectors comprise a first connector for directly connecting to a first of the plurality of field wireless management stations and a second connector for directly connecting to a second of the plurality of field wireless management stations, and
   wherein the synchronizing cable provides a physical connection between the first connector and the second connector.

2. The network management system according to claim 1, wherein that the plurality of redundantly connected field wireless management stations are connected so as to be individually identified by the synchronizing cable and the synchronizing connectors.

3. The network management system according to claim 1, wherein the synchronizing cable and the synchronizing connectors also include a power wire.

4. The network management system according to claim 1, wherein it is detected whether the synchronizing cable and the synchronizing connectors are pulled out from or inserted into at least one of the field wireless management stations in accordance with a function which individually identifies the plurality of redundantly connected field wireless management stations by the synchronizing cable and the synchronizing connectors.

5. The network management system according to claim 1, wherein each of the synchronizing connectors are configured to short circuit distinct combinations of wires of the synchronizing cable.

6. The network management system according to claim 1, wherein the plurality of field wireless management stations each comprise a pin identifier configured to detect a short circuit signal.

* * * * *